United States Patent
Pepper et al.

(10) Patent No.: US 7,769,049 B2
(45) Date of Patent: Aug. 3, 2010

(54) TRAFFIC GENERATOR USING PARALLEL COHERENT TRANSMIT ENGINES

(75) Inventors: Gerald Pepper, Thousand Oaks, CA (US); Viet Quoc Tran, Reseda, CA (US)

(73) Assignee: Ixia, Calabasas, CA (US)

(*) Notice: Subject to any disclaimer, the term of this patent is extended or adjusted under 35 U.S.C. 154(b) by 83 days.

(21) Appl. No.: 12/253,836

(22) Filed: Oct. 17, 2008

(65) Prior Publication Data
US 2010/0098087 A1    Apr. 22, 2010

(51) Int. Cl.
H04J 3/02    (2006.01)
H04J 3/24    (2006.01)

(52) U.S. Cl. ........................... 370/474; 370/537
(58) Field of Classification Search ............ None
See application file for complete search history.

(56) References Cited

U.S. PATENT DOCUMENTS

| | | |
|---|---|---|
| 5,343,463 A | 8/1994 | van Tetering et al. |
| 5,600,632 A | 2/1997 | Schulman |
| 6,028,847 A | 2/2000 | Beanland |
| 6,108,800 A | 8/2000 | Awawa |
| 6,122,670 A | 9/2000 | Bennett et al. |
| 6,148,277 A | 11/2000 | Asava |
| 6,345,302 B1 | 2/2002 | Bennett et al. |
| 6,789,100 B2 | 9/2004 | Nemirovsky |
| 6,950,405 B2 | 9/2005 | Van Gerrevink |
| 2002/0080781 A1 | 6/2002 | Gustavsson |

FOREIGN PATENT DOCUMENTS

EP    0895375    2/1999

*Primary Examiner*—Gregory B Sefcheck
(74) *Attorney, Agent, or Firm*—SoCal IP Law Group LLP; Steven C. Sereboff; John E. Gunther (57) ABSTRACT

There is disclosed a packet generator and method of generating a packet flow. The packet generator may include a plurality of parallel transmit engines to form packets for transmission and a multiplexer to coherently interleave packets formed by the plurality of transmit engines.

16 Claims, 8 Drawing Sheets

FIG. 4A
Packet Forming Data

FIG. 4B
Packet Sequence Data

TRAFFIC GENERATOR USING PARALLEL COHERENT TRANSMIT ENGINES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. In order to test a packet switched network or a device included in a communications network, it is often desirable to generate network traffic having a data rate equal to the line rate or maximum possible data rate of the network communication path or device.

A series of packets originating from a single source and having a specific type of packet and a specific rate will be referred to herein as a "stream." A source may support multiple outgoing and incoming streams simultaneously and concurrently, for example to accommodate multiple packet types or rates. A source may be, for example, a port on a network interface. "Simultaneously" means "at exactly the same time." "Concurrently" means "within the same time." A plurality of concurrent streams may be combined to form what will be referred to herein as a "flow". A single flow may represent a plurality of packet types. The streams within a flow may be combined through interleaving. The interleaving may be balanced, unbalanced, and distributed among the represented streams. The data rate of a flow may be equal to the line rate of a network communication path over which the flow is transmitted. Although the packets within a stream may be transmitted at the line rate, the average data rate of a stream over time may be much lower, since a plurality of interleaved streams may share the data rate of the flow.

One or more line-rate test flows may be required to thoroughly test a packet switched network or item of network equipment. Each test flow may be composed of a plurality of interleaved streams representing multiple packet types. To test a modern "triple play" network and network equipment, a flow may contain simulated data, audio, and video streams. Since each test flow may simulate network traffic that might be generated by a large plurality of sources during actual use of the communication network, the data rate of a test flow may exceed the capacity of a single packet generator. Thus the generation of high speed test flows may require combining the outputs of multiple packet generators.

Throughout this description, elements appearing in block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits.

In block diagrams, arrow-terminated lines may indicate data paths rather than signals. Each data path may be multiple bits in width. For example, each data path may consist of 4, 8, 16, 32, 64, or more parallel connections.

DETAILED DESCRIPTION

Description of Apparatus

Figure 1:
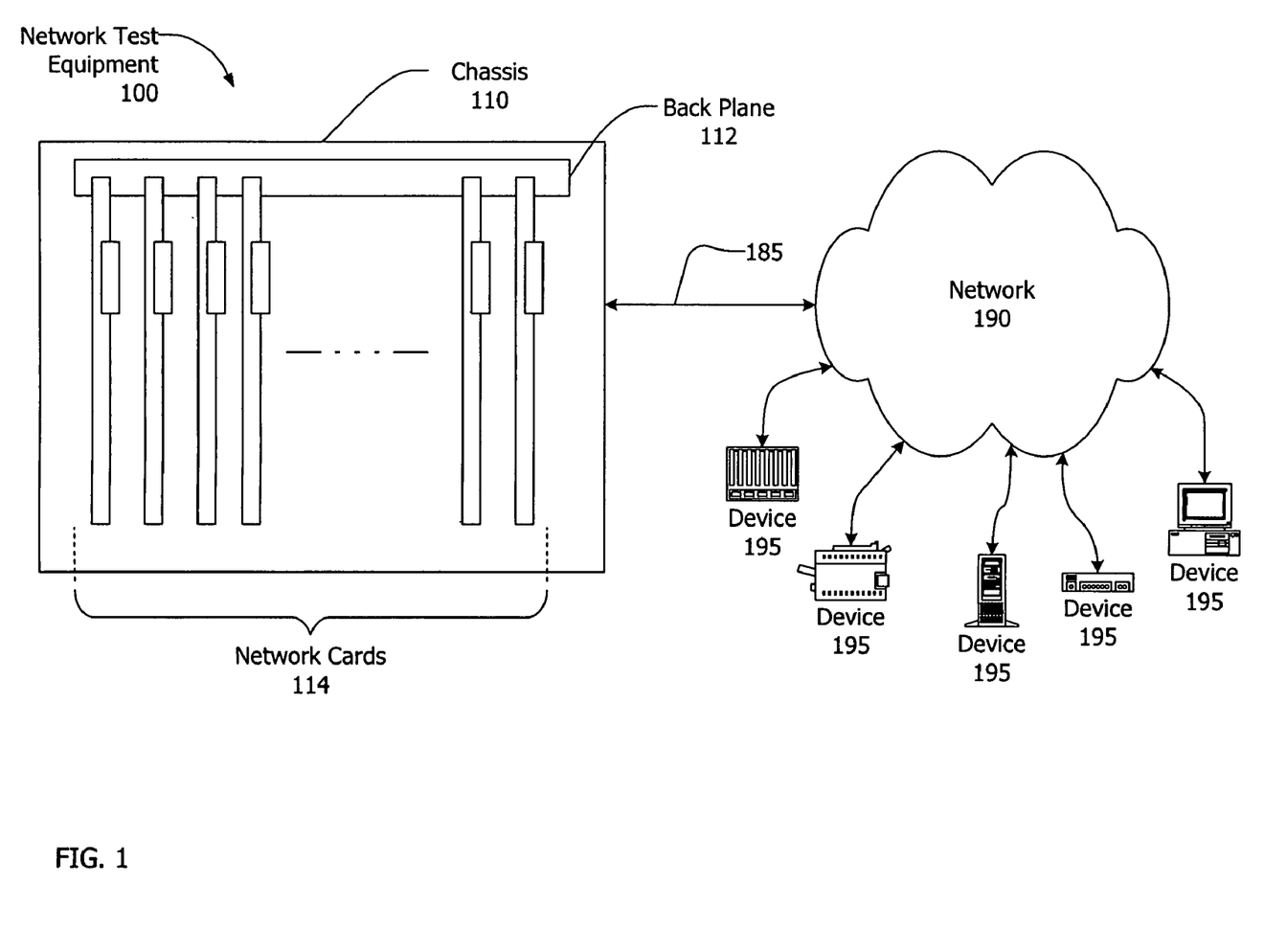
FIG. 1 is a block diagram of a network environment.

Referring now to FIG. 1, there is shown a block diagram of a network environment. The environment may include network test equipment 100, a network 190 and plural network devices 195.

The network test equipment 100 may be a network testing device, performance analyzer, conformance validation system, network analyzer, or network management system. The network test equipment 100 may include one or more network cards 114 and a back plane 112 contained or enclosed within a chassis 110. The chassis 110 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 114 may support one or more well known standards or protocols such as the various Ethernet and Fibre Channel standards, and may support proprietary protocols as well.

The network cards 114 may include one or more field programmable gate arrays (FPGAs), application specific integrated circuits (ASICs), programmable logic devices (PLDs), programmable logic arrays (PLAs), processors and other kinds of devices. In addition, the network cards 114 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 114 may provide one or more network ports. The ports of the network cards 114 may be connected to the network through a communication medium 185, which may be a wire, an optical fiber, a wireless link, or other communication medium. Each network card 114 may support a single communications protocol, may support a number of related protocols, or may support a number of unrelated protocols. The network cards 114 may be permanently installed in the network test equipment 100 or may be removable.

The back plane 112 may serve as a bus or communications medium for the network cards 114. The back plane 112 may also provide power to the network cards 120.

The network devices 195 may be any devices capable of communicating over the network 190. The network devices 195 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 195 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 195 may communicate simultaneously with one another, and there may be plural logical communications between the network test equipment 100 and a given network device 195. The network itself may be comprised of numerous nodes providing numerous physical and logical paths for data to travel.

Figure 2:
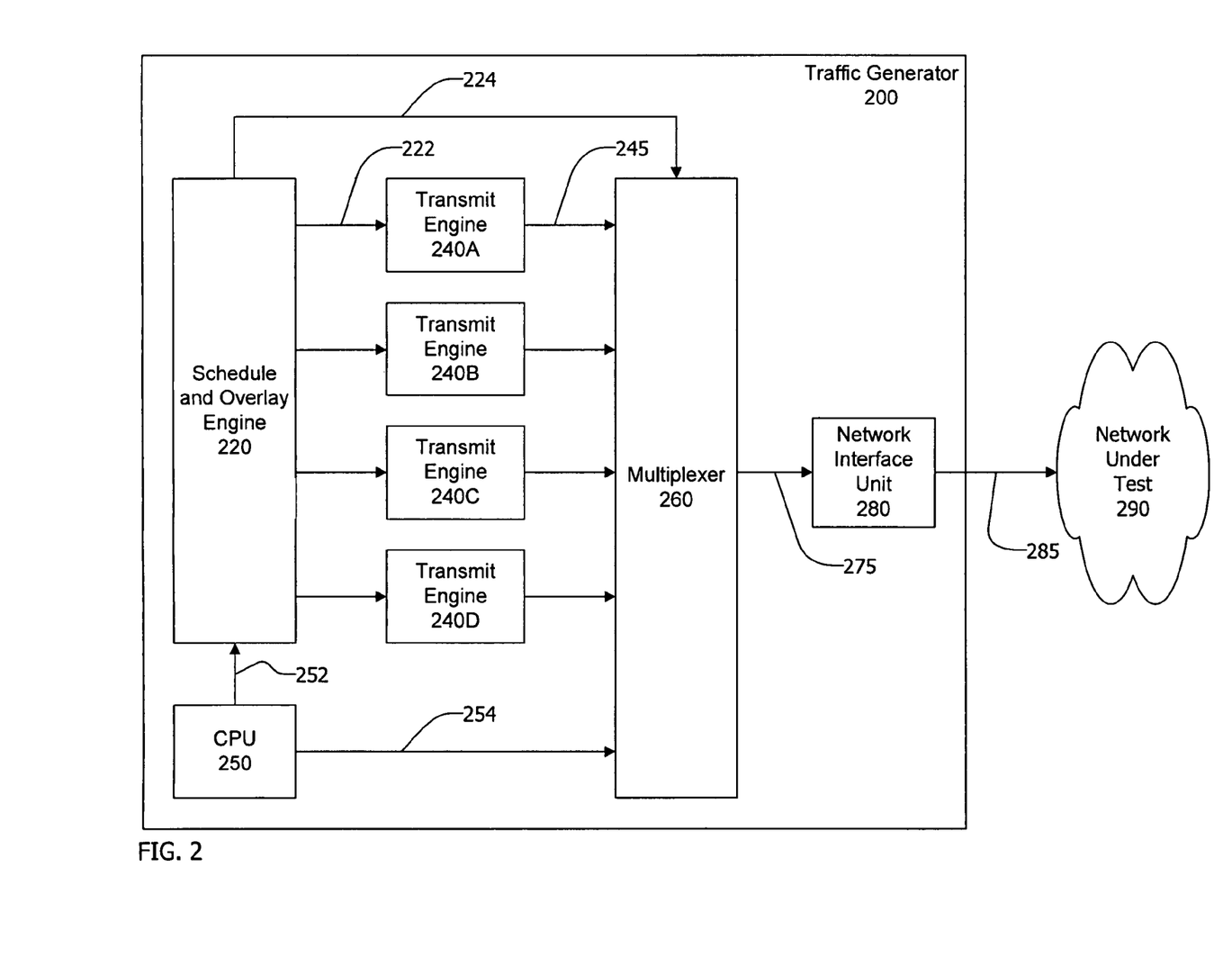
FIG. 2 is a block diagram of a traffic generator which includes coherent parallel transmit engines.

Referring now to FIG. 2, an exemplary traffic generator 200 may include a schedule and overlay engine 220, a plurality of transmit engines 240A, 240B, 240C, 240D, a multiplexer 260, a network interface unit 280, and a central processing unit (CPU) 250. Within this description, the term "engine" means a collection of hardware, which may be augmented by firmware and/or software, that performs the described functions. While the exemplary traffic generator shown in FIG. 2 includes four transmit engines 240A-240D, the traffic generator 200 may have more or fewer (but not less than two) transmit engines.

The CPU 250 may provide the schedule and overlay engine 220 with instructions 252 to form a plurality of streams that may be interleaved to form the data flow 275. Each of the streams may include a sequence of packets. The packets within each steam may be of the same general type but may vary in length and content. The schedule and overlay engine 220 may perform multiple functions including scheduling the sequence of packets to be generated, and determining the length and variable content for each packet. The schedule and overlay engine 220 may then assign each packet to one of the plurality of transmit engines 240A-240D. The transmit engines 240A-240D may work independently in parallel to generate their assigned packets.

The schedule and overlay engine 220 may pass packet forming data 222 required to generate each packet to the assigned transmit engine 240A-240D. The packet forming data 222 passed from the schedule and overlay engine 220 to the assigned transmit engine 240A-240D may include a stream identifier which also identifies the type of packet, a packet length, variable data to be incorporated into the packet, and instructions for filling the packet payload.

The schedule and overlay engine 220 may also pass packet sequence data 224 to the multiplexer 260. The packet sequence data 224 may include data identifying which of the transmit engines 240A-240D will contribute the next packet to the data flow 275. The multiplexer may coherently combine the packets formed by the transmit engines 240A-240D to form the data flow 275. Within this description, the term "coherently" means "in a coherent manner", where "coherent" has its conventional definition of "logically consistent and ordered". Specifically, "to coherently combine" the packets generated by the transmit engines 240A-240D means that the packet are combined in an intended order that is determined before the packets are generated.

The network interface unit 280 may convert the data flow 275 from the multiplexer 280 into the electrical, optical, or wireless signal format required to transmit the data flow to the network under test 290 via a link 285, which may be a wire, an optical fiber, a wireless link, or other communication link.

The traffic generator 200 may include a CPU 250 which may contain a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The CPU 250 may also generate a stream of packets 254 to the multiplexer 260. The packets generated by the CPU 250 may represent stateful, interactive communication with some device within the network 290 using, for example, a TCP/IP stack implemented within the CPU 250.

The schedule and overlay engine 220, the transmit engines 240A-240D, the CPU 250, the multiplexer 260 and the network interface unit 280 may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The physical partitioning of the components of the traffic generator 200 may be different from the functional partitioning shown in FIG. 2, such that a given functional component or block may be divided between two or more circuit devices and a single circuit device may contain all or portions of two or more functional components or all functional components.

The data flow to the network over the link 285 may have a maximum data rate, commonly termed the "line rate". The data flow over the link 285 may use encoding to facilitate transmission. The encoding may cause the line rate and the actual clock rate for the data to be different. For example, the actual clock rate of a 10 GHz link using 64 bit to 66 bit encoding may be 10.3125 GHz. The data rate for the path between the multiplexer 260 and the network interface unit 280 may be the same as the line rate. The data rate for the paths between the transmit engines 240A-240D and the multiplexer 260 may be less than the line rate. The data rate between the transmit engines 240A-240D and the multiplexer 260, which may equal the rate at which packets are formed within the transmit engines 240A-240D, may be equal to, or slightly greater than, the line rate divided by the number of transmit engines (4 in the example of FIG. 2).

Figure 3:
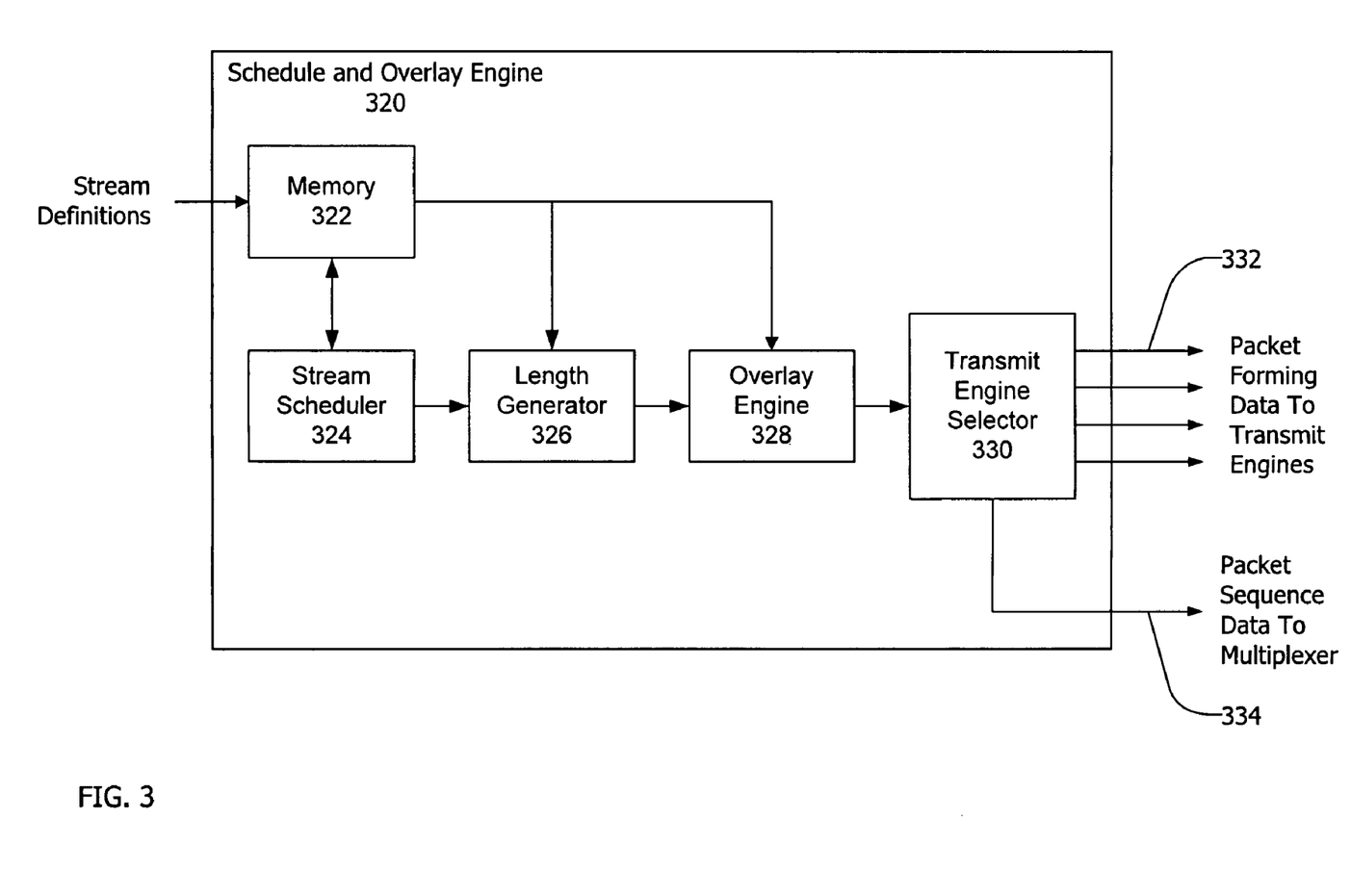
FIG. 3 is a block diagram of an exemplary schedule and overlay engine.

FIG. 3 shows a functional block diagram of an exemplary schedule and overlay engine 320, which may be suitable for the schedule and overlay engine 220 in FIG. 2. The exemplary schedule and overlay engine 320 may include a memory 322 to store a plurality of stream definitions, a stream scheduler 324, a length generator 326, and overlay engine 328, and a transmit engine selector 330.

The memory 322 may be loaded with the definitions of a plurality of streams that constitute a testing session. The memory may be loaded from the CPU 250 shown in FIG. 2, or may be loaded from another computer (not shown) which may direct and monitor network tests. The definition of each of the plurality of streams may include data defining the stream type such as TCP/IP, UDP/IP, or other type of stream. The definition of each of the plurality of streams may also include instructions for setting various fields, such as address fields, within each packet of the stream, instructions for setting the length of each packet in the stream, and instructions for filling the body of the packets. The definition of each of the plurality of streams may include the rates at which the packets comprising the stream are to be transmitted. The definition of each of the plurality of streams may include other data and instructions.

The stream scheduler 324 may determine the next packet to be formed by first determining the next stream to contribute a packet to the data flow based on the stream definitions stored in the memory 322. To this end, the stream scheduler may develop lists of departure times or departure intervals for the packets comprising the streams. These lists may also be stored in the memory 322. Alternatively, the stream scheduler may develop linked lists of the transmission rates of the plurality of streams. The stream scheduler may include priority logic to resolve conflicts when two or more streams are scheduled to transmit packets simultaneously.

After the stream scheduler 324 has identified the next stream and the next packet to be formed, the length generator 326 may establish the length of the next packet. The length of the next packet may be constant within the stream, may be random, may be calculated by adding a predetermined constant to the length of the previous packet in the stream, or may be established in some other manner.

After the stream scheduler 324 has identified the next stream and the next packet to be formed, the overlay engine 328 may establish overlay data for the next packet. The overlay engine 328 may determine the overlay data concurrently or after the length generator determines the packet length. The overlay data may be any data that is not constant between packets of the next stream. The overlay data may be established by calculation, such as by adding a predetermined number to the corresponding data of the previous packet in the stream. The overlay data may also be determined randomly, may be determined from a table of stored values, or may be determined in some other manner as instructed by the stream definition for the next packet. One or more fields of overlay data may be established for each packet. Each field of overlay data may be established in a different manner.

After the packet length and overlay data have been established, the transmit engine selector 330 may select one of a plurality of transmit engines (not shown in FIG. 3) to form the packet. The transmit engine selector 330 may select any transmit engine that is idle. In the situation where all of the plurality of transmit engines are occupied forming packets, the transmit engine selector 330 may select the next engine that will become available after completing the packet currently being formed. The transmit engine selector 330 may provide packet forming data 332 necessary to form the packet to the selected transmit engine. The transmit engine selector 330 may be a first-in first-out (FIFO) buffer that temporarily stores the packet forming data 332. In this case, the next available transmit engine may pull the packet forming data 332 from the FIFO buffer.

Figure 4A:
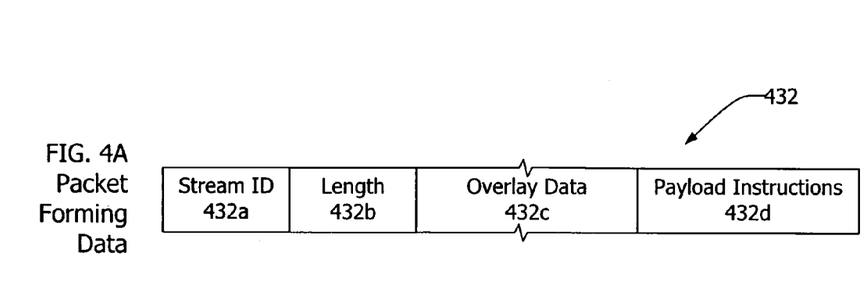
FIG. 4A is a schematic diagram of an exemplary packet forming data.

Once a transmit engine has been selected, packet sequence data 334 may be provided to a multiplexer (not shown in FIG. 3). The packet sequence data 334 may include data required to coherently combine the next packet with other packets to form the data flow FIG. 4A illustrates packet forming data 432 that may be provided by a schedule and overlay engine, such as the schedule and overlay engine 220, to a transmit engine. The packet forming data 432 may include stream identification data 432a or some other data indicating the type of packet to be formed.

The packet forming data 432 may also include the length 432b of the packet to be formed. However, in some cases the length of the packets for a stream (as defined by the stream ID 432a) may be fixed and the length 432b may be omitted.

The packet forming data 432 may also include overlay data 432c which may be any data that varies between the packets of the stream. The overlay data may include data that will be inserted into either the header or the body of the packet. An example of the use of overlay data would be to insert progressively or randomly changing IP addresses into TCP/IP packets. Streams may be defined that simply transmit the same packet repetitively, in which case the packet forming data may be omitted.

The packet forming data 432 may also include one or more payload instructions 432d which tell the transmit engine how to fill the payload, or body, of the packet. Payload instructions 432d may instruct the transmit engine to fill the payload with a fixed content (i.e., all zeros or a fixed pattern in each byte), to fill the payload randomly, or to fill the payload in some other manner. Certain types of control packets may not have payloads, and the payload instructions 432d may be omitted.

Figure 4B:
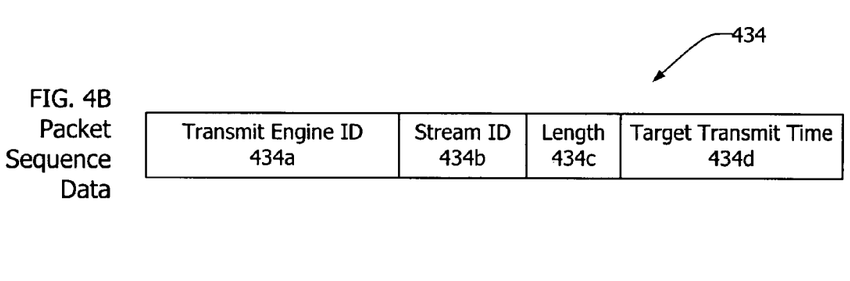
FIG. 4B is a schematic diagram of an exemplary packet schedule data.

FIG. 4B illustrates packet sequence data 434 that may be provided by a schedule and overlay engine, such as the schedule and overlay engine 220, to a multiplexer that combines the packets formed by a plurality of transmit engines. The packet sequence data 434 may include a transmit engine ID 434a identifying the transmit engine that has been assigned to form a packet. The transmit engine ID 434a may be used by the multiplexer to place packets in the proper sequence for transmission. For example, the packet sequence data for a plurality of packets may be placed in a FIFO buffer in the sequence that the packets are to be transmitted. A multiplexer, upon completing the transmission of a current packet may then pull the packet sequence data for the next packet from the FIFO buffer and use the transmit engine ID to determine which of a plurality of transmit engines is holding or has formed the next packet.

The packet sequence data 434 for a packet to be transmitted may also include a stream identification 434b, or other data identifying the type of the packet, and the length of the packet 434c. Alternatively, a multiplexer may determine either or both of the type of packet and the length of the packet from the packet header and the corresponding type and length data may not be included in the packet sequence data.

The packet sequence data 434 for a packet to be transmitted may additionally include a target transmit time 434d. The multiplexer that receives the packet sequence data may use the target transmit time 434d to control transmission of time-critical packets.

Figure 5A:
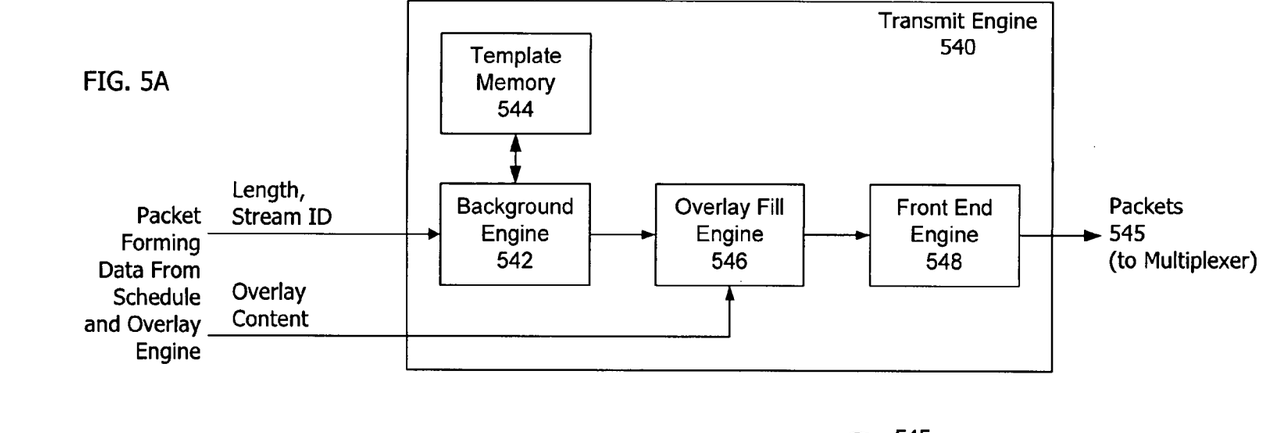
FIG. 5A is a block diagram of an exemplary transmit engine.

Referring now to FIG. 5A, an exemplary transmit engine 540, which may be suitable for use as the transmit engines 240A-240D, may include a template memory 544, a background engine 542, an overlay fill engine 546, and a front end engine 548.

The template memory 544 may store templates for each of the packet streams and/or packet types that may be formed by the transmit engine 540. Each template may define a specific packet structure including the length and content of the packet header, the location and content of any fixed data fields, the location and extend of any fields to be filled by overlay data, the location and type of any checksums or other calculated fields, and other information necessary to form the packet. The template memory 544 may be a read-only memory to store a fixed set of templates, or a writable memory where packet templates may be stored dynamically, or a combination of read-only and writable memories. Packet templates may be stored in a writable template memory 544 by a processor (not shown), for example, at the start of each test session.

Upon receipt of packet forming data including a stream ID or other data indicating the type of packet to be formed, the background engine 542 may retrieve the appropriate packet template from the template memory 544. The background engine 542 may also extend or truncate the template to set the packet length as indicated in the packet forming data.

After the appropriate template has been retrieved, the overlay fill engine 546 may insert the overlay data included in the packet forming data into the appropriate fields of the packet as indicated by the template. One of the background engine 542 and the overlay fill engine 546 may fill the payload of the packet 545 as instructed in the packet forming data.

After the packet length has been set, the payload has been filled, and the overlay data has been inserted, a front end engine 548 may complete forming the packet 545 by computing and inserting any required checksums. For example, the front end engine 548 may compute an IP header checksum, a TCP header checksum, and a CRC code or checksum for the entire packet. The header checksums may be calculated and inserted into the packet before the packet 545 is sent to a multiplexer (not shown), since the header checksums are commonly positioned in the packet before at least a portion of the data being checked. A checksum for an entire packet may be calculated while the packet is being sent and then inserted at the very end of the packet.

Figure 5B:
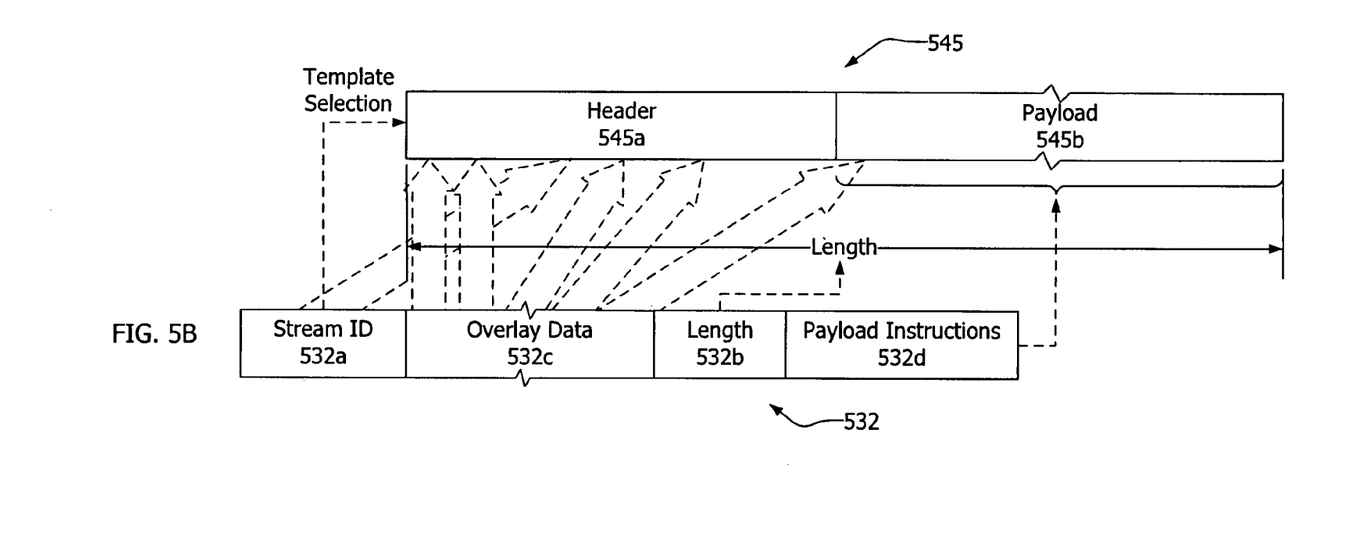
FIG. 5B is a graphical representation of the operation of the exemplary transmit engine of FIG. 5A.

FIG. 5B graphically depicts the function of the exemplary transmit engine 540. The packet forming data 532 may include a stream ID 532a which may be used to select a packet template. The packet forming data 532 may include overlay data 532c which may be inserted into fields within the packet header 545a and/or payload 545b, as defined by the packet template and indicated by the dashed arrows. The stream ID 532a may also be inserted into a field in the packet.

The packet forming data 532 may also include a packet length 532b which may be used to set the length of the packet 545. Commonly, the length of the packet 545 may be set by adjusting the length of the payload 545b. The packet forming data 532 may also include payload instructions that may be used to form content for the packet payload 545b.

Figure 6:
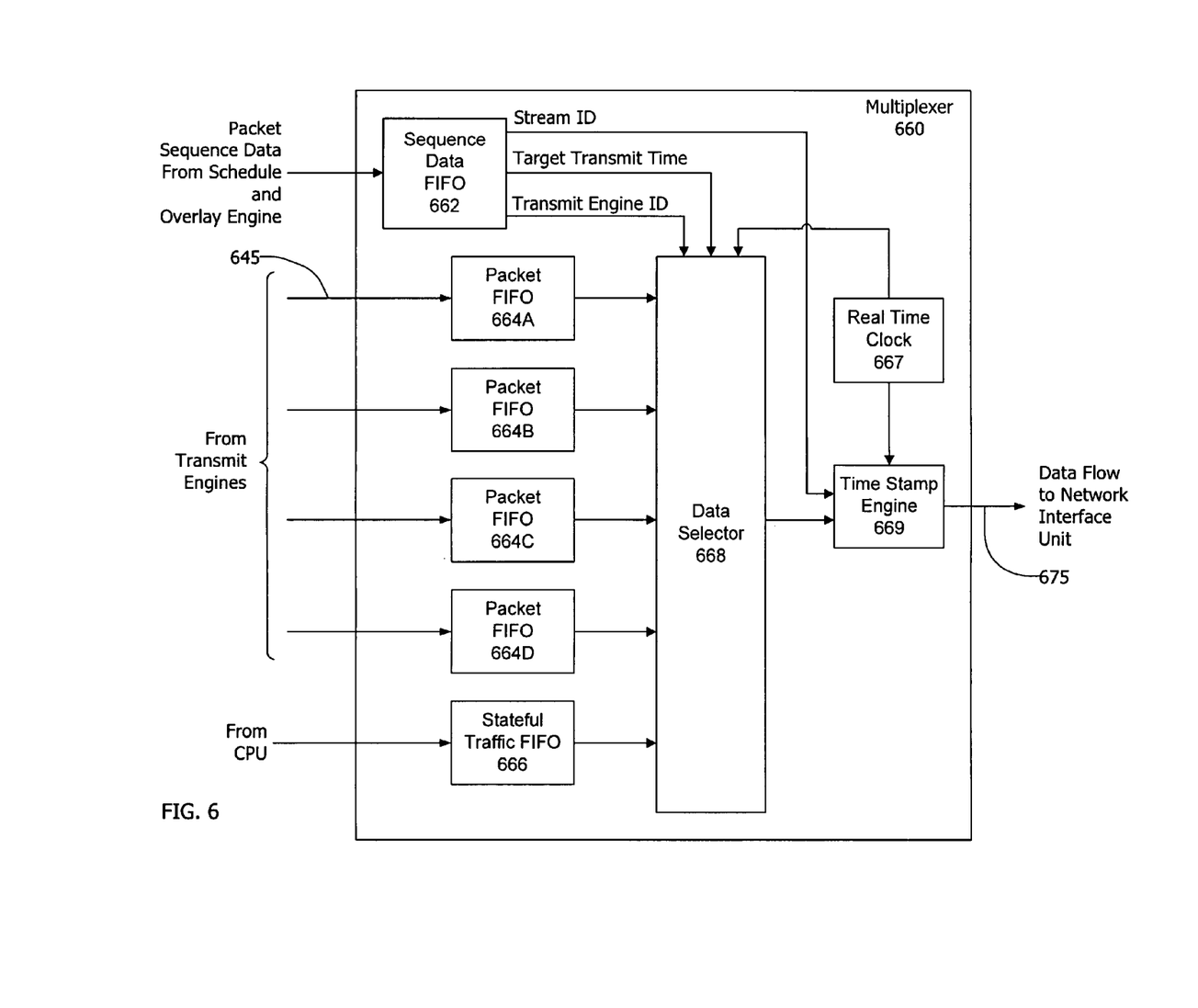
FIG. 6 is a block diagram of an exemplary multiplexer unit.

Referring now to FIG. 6, an exemplary multiplexer 660, which may be suitable for use as the multiplexer 260, may include a sequence data FIFO buffer 662, a plurality of packet FIFO buffers 664A-664D corresponding to a plurality of transmit engines (not shown), and a data selector 668. The exemplary multiplexer 660 may also include a stateful traffic FIFO buffer 666, a real time clock 667, and a time stamp engine 669. Each FIFO buffer may include, for example, a memory with pointer registers to indicate the address where new data may be written and where the oldest data in the memory data may be read. The exemplary multiplexer 660 may receive packets 645 from the plurality of transmit engines and may interleave the packets into a data flow 675 sent to a network interface unit (not shown).

Packets 645 may be loaded into the packet FIFO buffers 664A-664D in the order that the packets are formed by the respective transmit engines. The order in which the packets are formed may have been controlled such that packets stored within any one packet FIFO buffers 664A-664D do not have to be reordered.

Packet sequence data may be loaded into the sequence data FIFO buffer 662 in the order that packets are to be placed in the data flow 675, such that the packet sequence data next to be read from the packet sequence data FIFO buffer 662 may be the packet sequence data for the next packet to be inserted into the data flow.

The data selector 668 may read packet sequence data for a packet from the sequence data FIFO buffer 662. The packet sequence data may include a transmit engine ID that identifies which transmit engine (not shown) formed the packet and thus which of the packet FIFO buffers 664A-664D now stores the packet. The data selector 668 may then read the packet from the identified packet FIFO buffer 664A, 664B, 664C, or 664D and send the packet to the network interface unit (not shown) as part of the data flow 675. As the data selector 668 completes sending the current packet, the data selector 668 may read the packet sequence data from the packet sequence data FIFO 662 to repeat the cycle for the next packet.

Packets placed in the stateful traffic FIFO 666 may have priority over packets stored in the packet FIFO buffers 664A-664D. The data selector 668 may delay reading a new packet from the packet FIFO buffers 664A-664D in order to read and send a packet from the stateful traffic FIFO.

The exemplary multiplexer 660 may include a real time clock 667 and a time stamp engine 669. The time stamp engine 669 may add a time stamp to some or all of the packets indicating the exact instant that each packet was transmitted as part of the data flow 675. The time stamp added to the packet may indicate a transmit time slightly later than real time to compensate for known delays in the network interface unit. Depending on the location of the time stamp within the packet, the time stamp engine 669 may also correct one or more checksums within the packet. To determine the appropriate position for the timestamp and the checksums within a packet, the time stamp engine 669 may extract a stream ID or other data defining the type of the packet from the packet sequence data associated with the packet.

The packet sequence data for some or all of the packets may include a target transmit time. The data selector 668 may compare the target transmit time of a packet with the time provided by the real time clock 667 and insert the packet into the data flow 675 at an appropriate time. The data selector 668 may insert the packet into the data flow 675 in advance of the target transmit time to compensate for known delays in the time stamp engine 669 and network interface unit (not shown).

Figure 7:
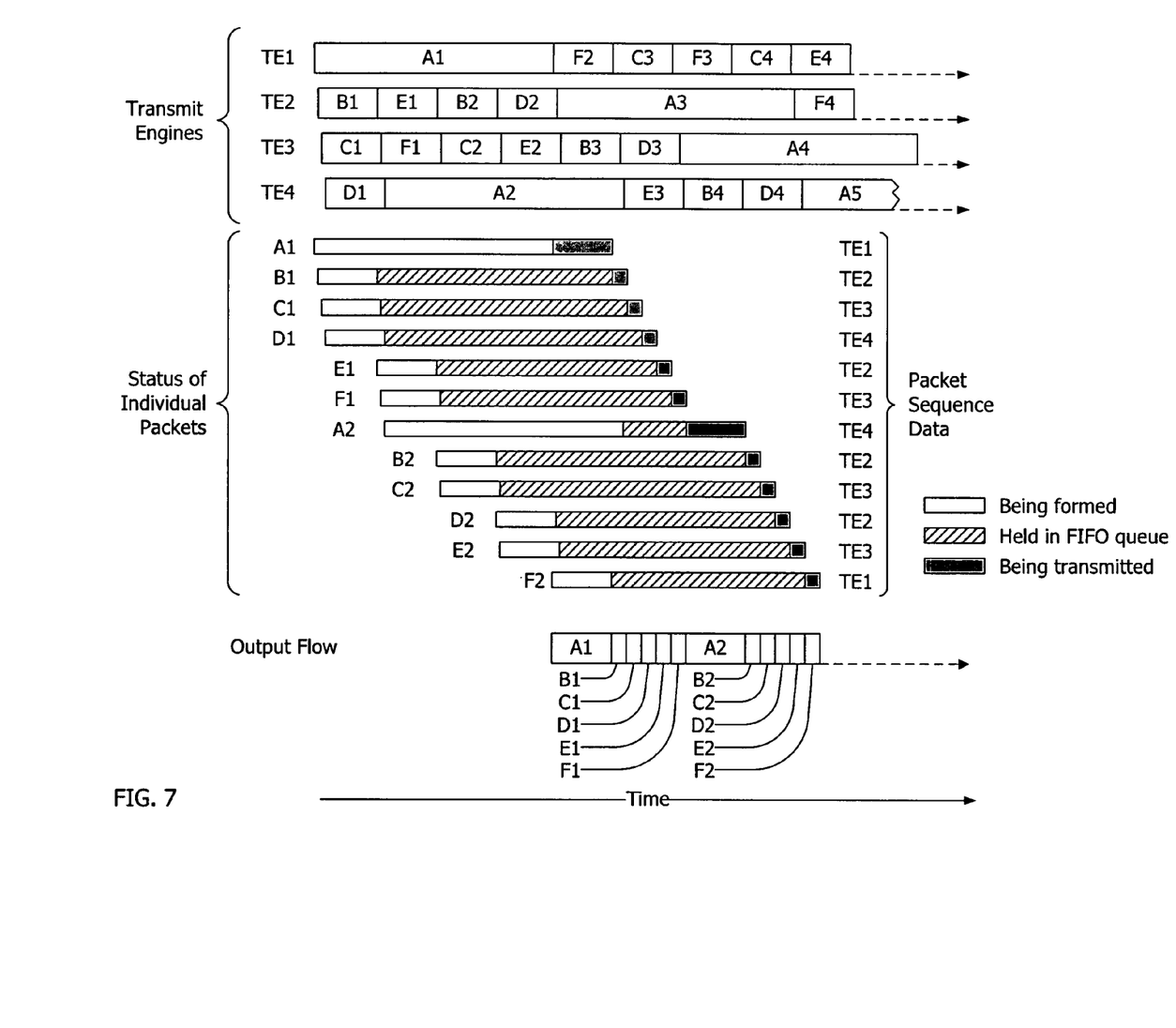
FIG. 7 is a timing diagram for an exemplary packet generator.

FIG. 7 is a timing diagram illustrating the operation of an exemplary traffic generator, which may be the traffic generator 200, that coherently combines the outputs of four parallel transmit engines identified as TE1-TE4. In this example, the traffic generator is generating an output flow including six streams, identified by the letters A-F. Each stream is composed of packets that are numbered sequentially. Each packet is identified by a letter-number pair, such that "A1" identifies the first packet in stream A. In this example, the length of the packets in stream A is defined to be four times the length of the packets in the other five streams B-F. This example also assumes that the desired packet sequence in the output flow is the first packet in each stream in order, followed by the second packet in each stream in order, and so on (A1, B1, C1, D1, E1, F1, A2 . . . F2, A3 . . . F3, etc.).

The four horizontal bars at the top of FIG. 7, labeled TE1-TE4, are timing diagrams showing the sequence in which the four transmit engines generate packets. Each segment of each horizontal bar identifies the packet being generated by the corresponding transmit engine during the corresponding time period. Inspection of these diagrams shows that, in this example, each packet in the sequence was assigned to an available transmit engine in a round robin manner. Packet A1 was assigned to TE1, B1 was assigned to TE2, C1 was assigned to TE3, and D1 was assigned to TE4. Since TE1 was still occupied generating A1, E1 was then assigned to TE2. F1 was assigned to TE3 and A2 was assigned to TE4. B2 was then assigned to TE2 because TE1 was still occupied generating packet A1.

The twelve bars at the center of FIG. 7, labeled A1-F2, are timing diagrams showing the status of twelve individual packets. Each horizontal bar has an un-shaded portion indicating the time when the packet is generated, a cross-hatched portion (except for packet A1) indicating the time when the packet is stored in a queue, and a solid portion indicating the time when the packet is actually output as part of the output flow. Since this example assumed the use of four transmit engines to generate the packets, the maximum time allowed to generate each packet (the un-shaded portion of each bar) is four times the length of the time required to transmit each packet (the solid portion of each bar).

The bar at the bottom of FIG. 7 shows the timing of the output flow, which combines the twelve individual packets A1-F2. The output flow is shown, for example, with the packets transmitted contiguously. Depending on network requirements, the output data flow may include gaps and/or synchronization data between consecutive packets. The output flow may also include packets, such as packets representing stateful traffic, generated by a CPU independent of the transmit engines.

Additional and fewer units, modules or other arrangement of software, hardware and data structures may be used to achieve the processes and apparatuses described herein.

Description of Processes

Figure 8:
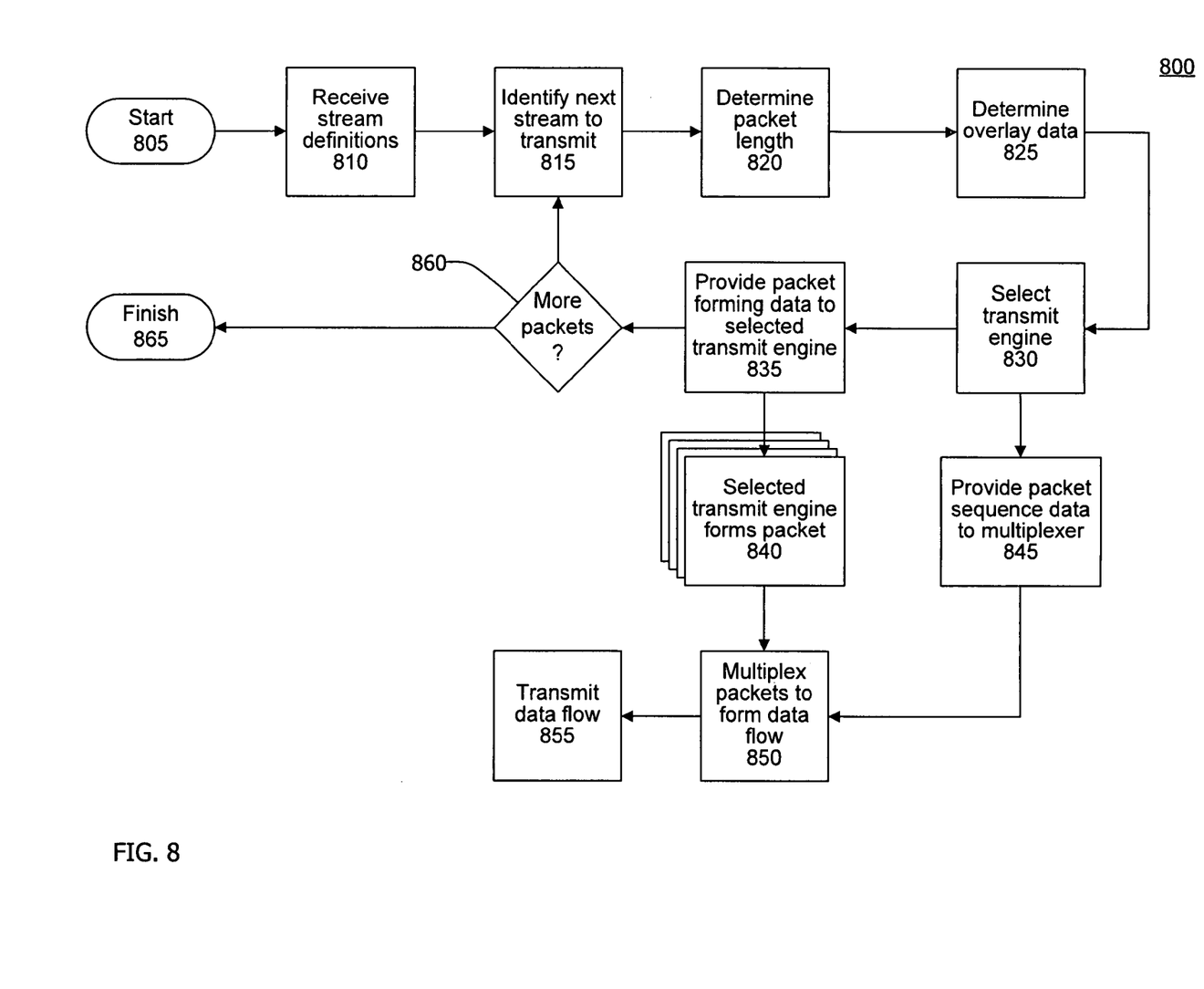
FIG. 8 is a flow chart of a method for generating a traffic flow.

Referring now to FIG. 8, a process for generating traffic in the form of an output flow may start at 805 and finish at 865. Although the flow chart shows both a start 805 and finish 865, the process is cyclical in nature and the actions from 815 to 860 may be repeated numerous times.

At 810, the definitions of a plurality of streams that constitute a test session may be received from, for example, a computer that monitors and controls network tests. At 815, the next stream to contribute a packet to the output flow may be identified based on the stream definitions. At 820 a length may be determined for the next packet in the stream identified at 815, and at 825 overlay data for the next packet may be calculated. The length of the next packet determined at 820 may be constant within the stream, may be random, may be progressive, or may be determined in some other manner. The overlay data determined at 825 may be any data that is not constant between packets of the stream identified at 815. The overlay data may be determined by calculation, such as by adding a predetermined number to the corresponding data of the previous packet in the stream identified at 815. The overlay data may also be determined randomly, may be determined from a table of stored values, or may be determined in some other manner.

At 830, one of a plurality of transmit engines may be selected to form the next packet. The selected transmit engine may be any transmit engine that is idle. In the situation where all of the plurality of transmit engines are occupied forming packets, the selected transmit engine may be the next engine that will become available after completing the packet currently being formed. The data required to form the next packet may be pushed into a FIFO buffer and the next available transmit engine may pull the data from the FIFO buffer.

Once a transmit engine has been selected at 830, packet forming data required to form the next packet may be provided to the selected transmit engine at 835 and the packet sequence data required to coherently combine the next packet with other packets to form the data flow may be provided to a multiplexer at 845. Packet forming data and packet sequence data were previously described.

At 860 a decision may be made if the test session is complete or if additional packets must be formed. If additional packets are required, the process returns to 815 and repeats until all packets have been formed. If all packets have been formed, the process terminates at 865.

At 840, the selected transmit engine may form the next packet as directed by the packet forming data provided at 835. Forming the next packet may include retrieving a stored template for the appropriate stream, setting the length of the packet, filling fields of the packet with variable data included in the packet forming data, and calculating one or more checksums. At 850, the next packet may be multiplexed with other packets generated by the same or other transmit engines in the sequence indicated by the packet sequence data provided at 845. At 855, the output flow may be transmitted over a link to a network or device under test.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A packet generator to transmit a data flow, comprising:
   a plurality of parallel transmit engines to generate packets for transmission
   a multiplexer to coherently interleave packets generated by the plurality of transmit engines to form the data flow
   a schedule and overlay engine
   wherein the schedule and overlay engine provides packet forming data to the plurality of transmit engines and provides packet sequence data to the multiplexer, the packet forming data including a stream identifier and overlay data for each packet
   wherein each transmit engine further comprises
      a template memory storing a plurality of packet templates associated with a corresponding plurality of streams
      a background engine to select a packet template from the template memory in accordance with the stream identifier
      an overlay fill engine to insert the overlay data into the selected packet template.

2. The packet generator of claim 1, wherein the packet forming data for each packet further includes one or more of a packet length, and payload instructions.

3. The packet generator of claim 1, wherein each transmit engine further comprises a front end engine including a checksum calculator.

4. The packet generator of claim 1, wherein the multiplexer further comprises:
   a plurality of FIFO buffers, each FIFO buffer coupled to receive packets from a corresponding one of the plurality of transmit engines
   a data selector to retrieve packets from the plurality of FIFO buffers to form the data flow.

5. The packet generator of claim 4, wherein the multiplexer further comprises:
   another FIFO buffer coupled between the schedule and overlay engine and the data selector to hold the packet sequence data.

6. The packet generator of claim 4, wherein the multiplexer further comprises:
   a real time clock
   a timestamp engine coupled between the data selector and a network interface unit to add a timestamp in accordance with the real time clock to at least some of the packets prior to transmission via the network interface unit.

7. The packet generator of claim 6, wherein
   the packet sequence data includes a target transmit time, and
   wherein the multiplexer outputs each packet at the corresponding target transmit time as indicated by the real time clock.

8. The packet generator of claim 1, wherein
   the multiplexer outputs the data flow at a first data rate, and
   the transmit engines generate packets at a second data rate lower than the first data rate.

9. The packet generator of claim 8, wherein
   the second data rate is equal to the first data rate divided by the number of transmit engines in the plurality of transmit engines.

10. The packet generator of claim 1, wherein coherently interleaved packets are added to the data flow in a sequence determined prior to the generation of the packets.

11. A method of generating a packet flow, comprising:
    providing packet forming data to a plurality of transmit engines, the packet forming data including a stream identifier and overlay data for each packet
    providing packet sequence data to a multiplexer
    the plurality of transmit engines generating packets, wherein generating each packet further comprises
       retrieving a template associated with the steam identifier from a template memory storing a plurality of templates respectively associated with a corresponding plurality of streams
       inserting the overlay data into the retrieved template
    the multiplexer coherently interleaving packets generated by the plurality of transmit engines to form the packet flow in accordance with the packet sequence data.

12. The method of generating a packet flow of claim 11, further comprising:
    storing definitions for the plurality of streams
    determining, from the stored definitions, a packet sequence
    generating the packet sequence data indicating the order in which packets from the plurality of packet streams are to be interleaved to form the packet sequence
    identifying a next packet in the packet sequence
    assigning the next packet to one of the plurality of transmit engines.

13. The method of generating a packet flow of claim 12, wherein the assigning further comprises
    determining the stream identifier of the next packet
    determining a length of the next packet
    determining the overlay data for the next packet
    providing the packet forming data including the stream identifier, the length, and the overlay data to the assigned transmit engine.

14. The method of generating a packet flow of claim 12, wherein the coherently interleaving further comprises:
    storing the packets generated by the plurality of transmit engines in a corresponding plurality of FIFO buffers
    selecting packets for transmission from the plurality of FIFO buffers in accordance with the packet sequence data.

15. The method of generating a packet flow of claim 14,
    wherein generating the packet sequence data includes setting target transmit times for at least some of the packets, and
    wherein coherently interleaving includes transmitting packets at the respective target transmit times.

16. The method of generating a packet flow of claim 11, wherein coherently interleaving comprises adding packets to the data flow in a sequence determined prior to the generation of the packets.

* * * * *